Patented Mar. 6, 1945

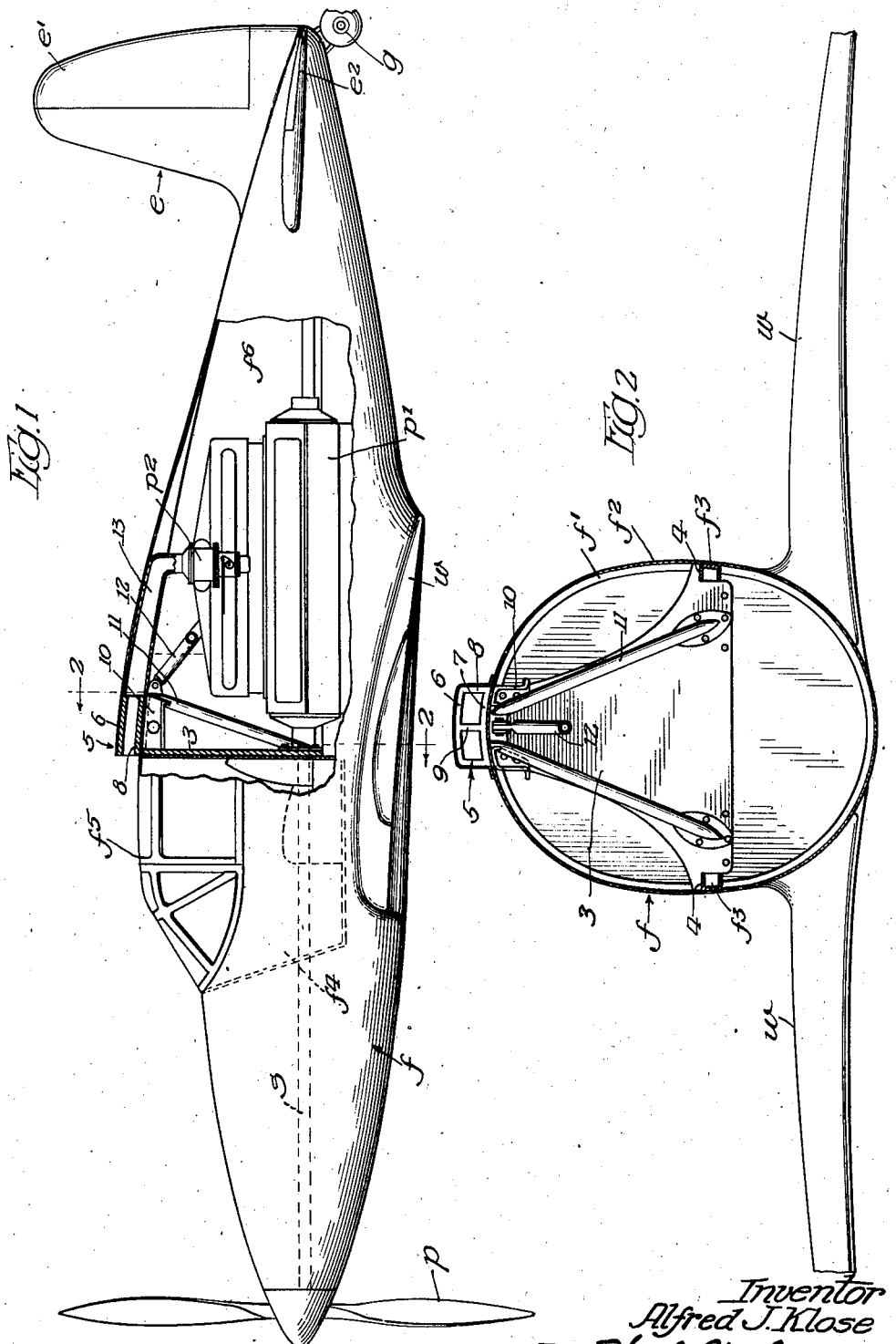

2,370,802

UNITED STATES PATENT OFFICE 2,370,802

COMBINATION OVERTURN STRUCTURE AND AIR SCOOP FOR AIRPLANES

Alfred J. Klose, Inglewood, Calif., assignor, by mesne assignments, to Consolidated Vultee Aircraft Corporation, a corporation of Delaware Application October 27, 1941, Serial No. 416,624

6 Claims. (Cl. 244—121)

The present invention relates generally to low-wing airplanes. More particularly the invention relates to that type of low-wing airplane in which the fuselage encases the propeller driving engine and has a cockpit enclosure and in addition an overturn structure behind the cockpit for protecting the pilot in the event that the airplane overturns or noses over while on the ground.

In the construction or manufacture of a low-wing airplane of this type it has heretofore been the practice to build the cockpit enclosure, or the super-structure directly aft of or behind the cockpit, to such a height as to include the overturn structure within the confines of the fuselage. It has also been the practice to employ a scoop on the fuselage exterior in order to feed or supply air to the carburetor for the engine. An airplane which is made in accordance with these practices is subject to the objection that the cockpit enclosure or fuselage super-structure behind the enclosure, due to its abnormal height, offers such a great frontal area as to prevent extremely high speed travel and otherwise reduce the efficiency of the airplane. It is also subject to the objection that the air scoop augments the drag or resistance of the high cockpit enclosure or fuselage super-structure.

The primary or principal object of the present invention is to provide a low-wing airplane of the type under consideration which is an improvement upon, and is not subject to the same objections as, previously designed airplanes of the same general character. The improved airplane is characterized by the fact that it comprises a combination overturn structure and air scoop in the form of a hollow open ended member which is disposed directly behind the cockpit and at the desired or proper distance above the pilot's head, forms the cap or principal part of the overturn structure and is connected by a duct to the carburetor inlet. By employing a member of this type, that is a member serving as a combination overturn structure and air scoop, it is possible to build the cockpit enclosure as well as the super-structure behind the enclosure to a minimum height and in this manner reduce the frontal area of the fuselage and thus eliminate drag.

A further object of the invention is to provide a low-wing airplane which is generally of new and improved construction and is characterized by the fact that it is extremely efficient and capable of high speed.

Other objects of the invention and the various advantages and characteristics of the present airplane will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like letters and numerals of reference denote corresponding parts throughout the several views:

Figure 1 is a side view of a low-wing airplane embodying the invention, certain parts being broken away and other parts being shown in cross section for purposes of illustration; and Figure 2 is a vertical transverse section taken on the line 2—2 of Figure 1 and illustrating in detail the construction, arrangement and design of the hollow open ended member which constitutes the combination overturn structure and air scoop.

The airplane which is shown in the drawing constitutes the preferred embodiment of the invention. It is essentially of the low-wing monoplane variety and comprises a fuselage $f$, a wing $w$ and an empennage $e$. The fuselage tapers forwardly and rearwardly from the central portion thereof and consists of an internal frame $f^1$ and a skin $f^2$ around the frame. The frame $f^1$ includes a pair of longerons $f^3$ at the sides thereof. In addition to the frame and skin the fuselage embodies a cockpit $f^4$ for the pilot of the airplane, an enclosure $f^5$ over the cockpit and an engine compartment $f^6$ behind the cockpit. The airplane is propelled by a propeller $p$ at the front end of the fuselage and this propeller is driven by way of an internal combustion engine $p^1$ in the compartment $f^6$. The engine is of the straight line variety and is provided with a carburetor $p^2$ for introducing gaseous fuel into the cylinders. A shaft $s$ extends between the hub of the propeller $p$ and one end of the crank shaft of the engine $p^1$ and serves as a driving connection between the propeller and the engine. The wing $w$ is secured to the central lower portion of the fuselage and projects from both sides of the fuselage. The empennage $e$ is carried by the rear end of the fuselage and consists of a rudder $e^1$ and a pair of pivotally mounted elevators $e^2$. The airplane is supported for travel on the ground by way of a landing gear and this comprises a pair of retractable wing supported wheels (not shown) and a tail wheel $g$.

The cockpit $f^4$ of the fuselage has a seat for the pilot and includes the usual instrument panel and control devices. The enclosure $f^5$ is in the form of a frame and a plurality of transparent panels of "Plexiglass" or like material. It has a semi-dome-shaped front portion and a movable hatch type member behind the dome-shaped portion and is of sufficient height to provide full head room for the pilot when the latter is seated in the cockpit. In addition to the parts heretofore mentioned the fuselage comprises a rigid metallic bulkhead 3. This bulkhead extends transversely of the fuselage and serves as a partition between the cockpit $f^4$ and the engine compartment $f^6$. Preferably the bulkhead is formed of metal. The lower side portions of the bulkhead are notched as at 4 and are seated on, and suitably secured to, the longerons $f^3$ of the internal reinforcing structure $f^1$ of the fuselage. The upper edge of the bulkhead is aligned with the top of the cockpit enclosure $f^5$.

In addition to the parts heretofore mentioned the airplane comprises a hollow member 5. This member serves as a combination overturn structure and air scoop and is located directly behind and above the cockpit enclosure $f^5$. It is formed of any suitable metal and comprises top and bottom walls 6 and 7 together with a pair of side walls 8 which extend between and serve vertically to space the top and bottom walls. The front and rear ends of the member are open, as shown in the drawing. For reenforcing purposes the central portion of the member is bridged by way of a vertical partition 9. This partition is disposed in parallel relation with the side walls 8 and extends between, and is secured to, the central portions of the top and bottom walls 6 and 7. The member 5 is carried by a bracket 10 which, as shown in Figure 1, is suitably secured to, and projects rearwardly from, the upper portion of the bulkhead 3. A pair of upstanding upwardly convergent braces 11 serve to support and reenforce the rear end of the bracket 10. The lower ends of these braces are fixedly secured to the lower side portions of the bulkhead 3 and the upper ends of the braces are suitably secured to the rear end of the bracket 10. Such end of the bracket is further supported by a third brace 12 which, as shown in the drawing, is connected to, and extends downwards and rearwards from, the rear end of the bracket and has a bifurcated lower end in straddled relation with the propeller driving engine $p^1$. The member 5 is fixedly secured to the bracket 10 in any suitable manner and it, together with the bracket, the bulkhead 3 and the braces 11 and 12, constitutes an overturn structure whereby crushing of the pilot and cockpit enclosure is prevented in the event that the airplane noses or turns over during travel on the ground. A sheet metal duct 13 extends between the rear end of the member 5 and the air intake of the carburetor $p^2$ for the engine $p^1$. When the airplane is in motion or operation the member 5 serves as a scoop whereby air is caused to enter the duct 13 and flow into the carburetor $p^2$. The member 5 has a twofold purpose in that it serves as a scoop for feeding air into the carburetor and also as the main or cap part of the overturn structure. By employing the member 5 and arranging it as shown and described the cockpit enclosure $f^5$ may be made of minimum height with a view of materially reducing the frontal area of the airplane fuselage and thus restricting or diminishing drag. By having the air scoop combined with the overturn structure the airplane as a whole is simplified and there is not only a reduction in weight but also a material elimination of drag in connection with flight. The member 5 together with its supporting structure in the form of the bracket 10, the bulkhead 3 and the braces 11 and 12 is sufficiently strong to withstand the forces which are encountered in connection with nosing over of the airplane. Said member is disposed at the proper or required distance above the pilot's head fully to protect the pilot against injury in connection with turnover of the airplane.

The herein described airplane is efficient as well as capable of traveling at extremely high speeds because the member 5 which, as heretofore pointed out, serves as a combined overturn structure and air scoop, results in a material reduction in weight and the elimination of drag. The member, due to its construction and arrangement fully protects the pilot of the airplane in the event of an overturn in connection with ground travel of the airplane.

Whereas the invention has been described and illustrated in connection with an airplane which is truly of the low-wing variety it is to be understood that the expression "low-wing" is not to be considered in its strict technical sense since the invention is capable of being embodied in an airplane of the mid-wing variety or any airplane wherein the wing is beneath the upper portion of the fuselage and an overturn structure is essential. It is also to be understood that the invention is not to be restricted to the details set forth since these may be modified within the scope of the appended claims without departing from the spirit and scope of the invention.

Having thus described my invention what I claim as new and desire to secure by Letters Patent is:

1. An airplane comprising a fuselage having a cockpit therein with an enclosure thereover and also having a supporting structure behind the cockpit, and a hollow exteriorly disposed scoop forming member with an open front end, positioned directly behind and above the enclosure, having the interior thereof communicating with a point within the fuselage, and rigidly connected to the supporting structure, said member and supporting structure being so designed and of such strength that the member serves not only as a scoop but also as an overturn medium for preventing collapse or crushing of the cockpit enclosure in the event the airplane noses or turns over during ground travel.

2. An airplane of the low wing monoplane type comprising a fuselage having a cockpit therein with a transparent enclosure thereover and also having a compartment behind the cockpit, and a rigid hollow externally disposed scoop forming member with an open front end, positioned directly behind and above the enclosure, having a duct leading from its rear end into said compartment, and rigidly connected to the supporting structure, said member and structure being so designed or constructed and of such strength that the member serves not only as a scoop but also as an overturn medium for preventing collapse or crushing of the cockpit enclosure in the event the airplane noses or turns over during travel on the ground.

3. An airplane comprising a fuselage having a cockpit therein with a transparent enclosure thereover and also having a rigid internal supporting structure directly behind the cockpit, and an elongated rigid hollow open ended member located on the fuselage so that it extends longitudinally of the latter and is positioned directly above and behind the enclosure, and fixedly connected to the supporting structure, said member and supporting structure being so designed and constructed and of such strength that the member functions as an overturn medium for preventing collapse or crushing of the enclosure in the event that the airplane noses or turns over during travel thereof on the ground.

4. An airplane comprising a fuselage having a cockpit therein with a transparent enclosure thereover and embodying a bulkhead positioned directly behind the cockpit and having the upper portion thereof substantially flush with the rear upper portion of the enclosure and provided with a rearwardly extending bracket, and an elongated rigid hollow member having open front and rear ends, arranged so that it extends longitudinally of the fuselage and is disposed directly behind and above the enclosure, and mounted fixedly on the bracket, said member being of such strength and so supported by the bracket and bulkhead that it serves as an overturn medium for preventing collapse or crushing of the cockpit enclosure in the event that the airplane noses or turns over during travel thereof on the ground.

5. An airplane comprising a fuselage having in the fore part thereof a cockpit with a transparent enclosure thereover and in its aft part a compartment with a rigid bulkhead between it and the cockpit, and a hollow member with an open front end, fixedly connected to the upper portion of the bulkhead so that it is disposed directly above and behind the enclosure, having a duct at its rear end leading into the compartment, and serving as a combination overturn structure and air scoop.

6. An airplane comprising a fuselage having in the fore part thereof a cockpit with a transparent enclosure thereover and in its aft part a compartment with a rigid bulkhead between it and the cockpit, a propeller-driving internal combustion engine provided with an air inlet and disposed in the compartment, and a hollow member with an open front end, fixedly connected to the upper portion of the bulkhead so that it is disposed directly above and behind the enclosure, having the rear end thereof connected to a duct leading to the air intake of the engine, and serving as a combination overturn structure and air scoop.

ALFRED J. KLOSE.